US012810818B2

(12) United States Patent
Lee

(10) Patent No.: US 12,810,818 B2
(45) Date of Patent: Nov. 24, 2026

(54) DISPLAY DEVICE AND OPERATING METHOD THEREOF

(71) Applicant: LG ELECTRONICS INC., Seoul (KR)

(72) Inventor: Jaehee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/249,018

(22) Filed: Jun. 25, 2025

(65) Prior Publication Data

US 2026/0004747 A1 Jan. 1, 2026

(30) Foreign Application Priority Data

Jun. 27, 2024 (WO) ................ PCT/KR2024/008969

(51) Int. Cl.
*G09G 3/34* (2006.01)

(52) U.S. Cl.
CPC .................................. *G09G 3/3406* (2013.01)

(58) Field of Classification Search
CPC ..... G09G 2300/023; G09G 2320/0686; G09G 2320/0626; G09G 2360/144
See application file for complete search history.

(56) References Cited

U.S. PATENT DOCUMENTS

2007/0008334 A1* 1/2007 Takeuchi ................. G09G 3/20 345/589
2011/0164047 A1* 7/2011 Pance ....................... G06F 3/01 361/679.01
2013/0147851 A1* 6/2013 Yim ..................... G09G 3/3225 345/690
2013/0314453 A1* 11/2013 Ko ........................... G09G 5/10 345/102
2014/0063049 A1* 3/2014 Armstrong-Muntner .................... H04N 23/611 345/619
2014/0139559 A1* 5/2014 Yoo ......................... G06F 3/147 345/690
2014/0185129 A1* 7/2014 Kim ....................... H10K 59/50 359/296

(Continued)

FOREIGN PATENT DOCUMENTS

KR 10-2013-0064486 6/2013
KR 10-2019-0010072 1/2019

(Continued)

OTHER PUBLICATIONS

PCT International Application No. PCT/KR2024/008969, International Search Report dated Mar. 24, 2025, 3 pages.

*Primary Examiner* — Dorothy Harris
(74) *Attorney, Agent, or Firm* — LEE, HONG, DEGERMAN, KANG & WAIMEY

(57) ABSTRACT

A display device according to according to an embodiment of the present disclosure may an image receiver configured to receive an image; a first panel including a plurality of pixels and configured to display the image received by the image receiver through the plurality of pixels; a second panel disposed on one side of the first panel and controlled to selectively transmit light to an area of the first panel; and a controller configured to: obtain image information of the image displayed on the first panel and control a transmittance of the second panel based on the obtained image information.

11 Claims, 15 Drawing Sheets

(56) References Cited

U.S. PATENT DOCUMENTS

| | | | | |
|---|---|---|---|---|
| 2016/0163268 | A1* | 6/2016 | Yoo | G09G 3/3611 345/694 |
| 2016/0379575 | A1* | 12/2016 | Kawai | G09G 3/3611 345/694 |
| 2017/0177150 | A1* | 6/2017 | Chang | G09G 5/30 |
| 2021/0280122 | A1* | 9/2021 | Huang | G09G 3/20 |
| 2022/0157265 | A1* | 5/2022 | Lee | G09G 3/3433 |
| 2022/0179251 | A1* | 6/2022 | Li | G02F 1/1396 |
| 2022/0342270 | A1* | 10/2022 | Park | G02F 1/166 |
| 2025/0061866 | A1* | 2/2025 | Chen | G09G 3/20 |
| 2025/0392780 | A1* | 12/2025 | Kim | H04N 21/43637 |

FOREIGN PATENT DOCUMENTS

| | | |
|---|---|---|
| KR | 10-2019-0143232 | 12/2019 |
| KR | 10-2021-0004472 | 1/2021 |

* cited by examiner

DISPLAY DEVICE AND OPERATING METHOD THEREOF

CROSS-REFERENCE TO RELATED APPLICATION

Pursuant to 35 U.S.C. § 119, this application claims the benefit of an earlier filing date and right of priority to International Application No. PCT/KR2024/008969, filed on Jun. 27, 2024, the contents of which are hereby incorporated by reference herein in its entirety.

BACKGROUND OF THE INVENTION

1. Field of the Invention

The present disclosure relates to a display device, and more specifically to a transparent display device.

2. Discussion of the Related Art

Digital TV services using wired or wireless communication networks are becoming common. Digital TV services may provide various services which cannot be provided by the existing analog broadcast service.

For example, Internet protocol television (IPTV) and smart TV services which are types of digital TV services provide interactivity to allow user to actively select a type of a program to be watched, a viewing time, etc. The IPTV and smart TV services may provide various additional services, such as Internet search, home shopping and online games, based on such interactivity.

Recent display device is equipped with a transparent display to display image transparently and expose the background behind the transparent display. Additionally, the display device may be provided with a physical light-blocking film on the rear of the transparent display to block light coming from the rear.

However, the conventional physical light-blocking film has the form of a roll screen, and may only shade an entire area extending in the long side direction of the transparent display as the light-blocking film moves, and may not block only a part of the entire area.

Accordingly, in the case of a high-luminance area or a fixed area such as a logo that is displayed at the same location for a certain period of time, a light in the high-brightness area or the fixed area cannot be locally blocked through the light-blocking film.

This causes problem in which afterimage prevention cannot be effectively achieved and a power consumption cannot be reduced.

SUMMARY OF THE INVENTION

The purpose of the present disclosure may be to provide a light-blocking function in conjunction with an image displayed on a transparent display device.

The purpose of the present disclosure may be to prevent afterimage while maintaining an image quality of a fixed image displayed on the transparent display device.

The purpose of the present disclosure may be to control the transmittance of a high-luminance area displayed on a transparent display device and reduce a power consumption by lowering a luminance.

A display device according to according to an embodiment of the present disclosure may an image receiver configured to receive an image; a first panel including a plurality of pixels and configured to display the image received by the image receiver through the plurality of pixels; a second panel disposed on one side of the first panel and controlled to selectively transmit light to an area of the first panel; and a controller configured to: obtain image information of the image displayed on the first panel and control a transmittance of the second panel based on the obtained image information.

An operating method of a display device, wherein the display device comprises an image receiver configured to receive an image, a first panel including a plurality of pixels and configured to display the image received by the image receiver through the plurality of pixels, a second panel disposed on one side of the first panel and controlled to selectively transmit light to an area of the first panel, according to according to an embodiment of the present disclosure may obtaining image information of the image displayed on the first panel; and controlling a transmittance of the second panel based on the obtained image information.

According to an embodiment of the present disclosure, an effect of preventing afterimage may be improved while maintaining the image quality of the fixed image displayed on the transparent display device. Additionally, as the luminance of the fixed image is reduced, the power consumption may be reduced.

According to an embodiment of the present disclosure, a contrast ratio difference between a main object and a background object may be maximized.

According to an embodiment of the present disclosure, by reducing the transmittance of the maximum brightness area and the minimum brightness area, the contrast ratio with the remaining area may be improved.

DETAILED DESCRIPTION OF THE PREFERRED EMBODIMENTS

Hereinafter, the present disclosure will be described in more detail with reference to the drawings. Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games may also be performed. A standardized general-purpose OS may be used for these various functions.

Accordingly, in the display device described in the present disclosure, various user-friendly functions may be performed because various applications may be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
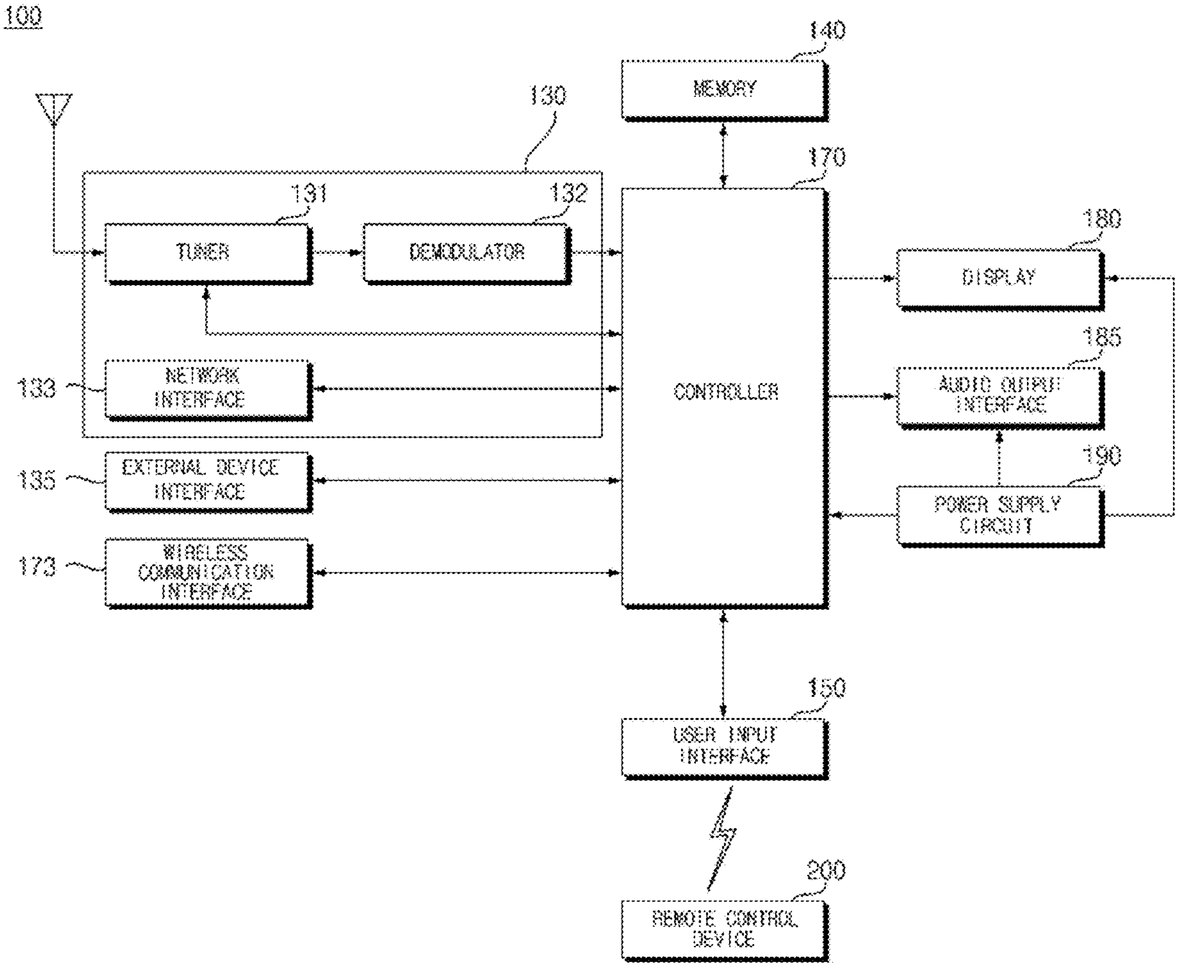
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include an image receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the speaker 185.

Figure 2:
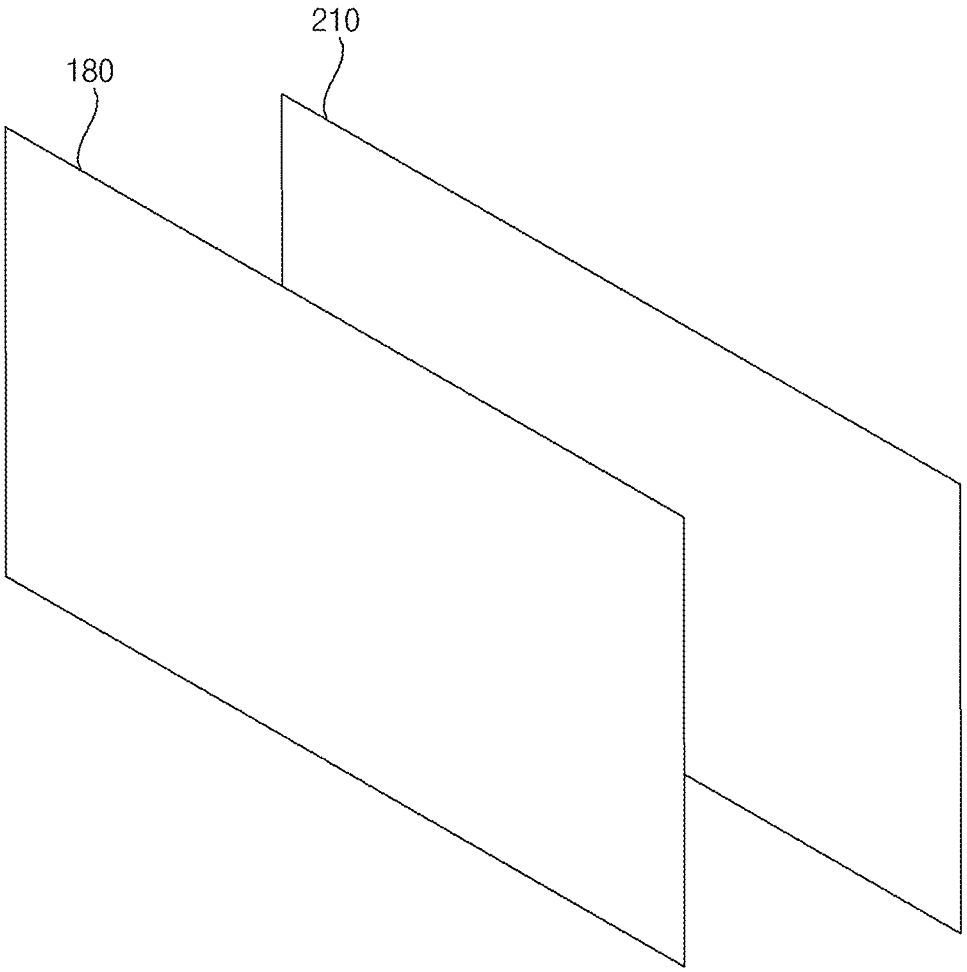
FIG. 2 is a diagram illustrating an electronic light-blocking method according to another embodiment of the present disclosure.

FIG. 2 is a diagram illustrating an electronic light-blocking method according to another embodiment of the present disclosure.

The display device 100 may further include a light-blocking panel 210 disposed on one side of the display 180. The light-blocking panel 210 may be included in the display 180 or may be a separately provided panel.

Hereinafter, it is assumed that the light-blocking panel 210 is a panel provided separately from the display 180. The light-blocking panel 210 may block a light incident on the display 180 through an electronic light-blocking method. The light-blocking panel 210 may selectively block the light incident on the display 180 through the electronic light-blocking method.

The light-blocking panel 210 may locally block the light incident on the display 180.

In the case of the electronic light-blocking method, the transmittance of a local area of the display 180 is electrically controlled, so that a light-blocking state of the display 180 may be controlled.

The light-blocking panel 210 may be one of a liquid crystal display (LCD) panel, a micro electro mechanical system (MEMS) panel, an electro wetting, or an electro chromic panel. When an LCD panel is used as the light-blocking panel 210, the light-blocking method may be referred to as a liquid crystal shutter method.

The controller 170 or an image driving circuit (not shown) may control the light-blocking panel 210 to control the transmittance corresponding to a partial area or an entire area of the display 180. The image driving circuit may be included in the controller 170 or may be a component provided separately from the controller 170. Each controller 170 or image driving circuit may be composed of one chip.

First, an example in which the light-blocking panel 210 is an LCD panel 210 and the transmittance is controlled locally will be described.

The controller 170 may transmit a control signal for controlling an arrangement of liquid crystal molecules corresponding to an area of the display 180 to the LCD panel 210, thereby adjusting the transmittance for the corresponding area.

The control signal that controls the arrangement of liquid crystal molecules may be a voltage signal that controls a voltage applied to the liquid crystal layer of the LCD panel 210.

The LCD panel 210 may include two polarizers, a thin film transistor (TFT), and a liquid crystal layer. Each of the two polarizers may transmit the light in one direction and block the light in the other direction.

The TFT may be a switching device that applies and blocks a voltage signal that controls the arrangement of liquid crystal molecules to the liquid crystal layer. Liquid crystal molecules in the liquid crystal layer may be aligned according to the voltage signal received from the TFT. The light may be passed or blocked depending on the arrangement of the liquid crystal molecules.

The light may pass through a first polarizer and then pass through the liquid crystal layer. When a polarization direction of the light changes in the liquid crystal layer, it may pass through a second polarizing plate. If the polarization direction of the light changes depending on the arrangement of the liquid crystal, an amount of light passing through the second polarizing plate may vary.

Because of this, a transparency of the LCD panel 210 may be adjusted. The transparency may be referred to as transmittance.

The controller 170 may locally adjust the transmittance of a specific area by applying or blocking a voltage only to pixels in a specific area through electrodes arranged in a matrix form on the LCD panel 210.

A MEMS panel may be composed of a substrate, a thin film layer, an air layer, and a reflective film layer. The MEMS panel may perform screen display according to two states, called a Open State and a Collapsed State.

When no voltage flows, the MEMS panel has separate the thin film layer and may selectively reflect. When a low voltage is applied, an electrostatic force is generated, allowing the reflective film layer to move and absorb all the light. In this way, the MEMS panel may control the transmittance of the light through the thin film layer and the reflective film layer.

An electrowetting panel may be a panel that controls the reflectivity and transmittance of the surface of the panel by using a shape change of a liquid droplet.

Figure 3A:
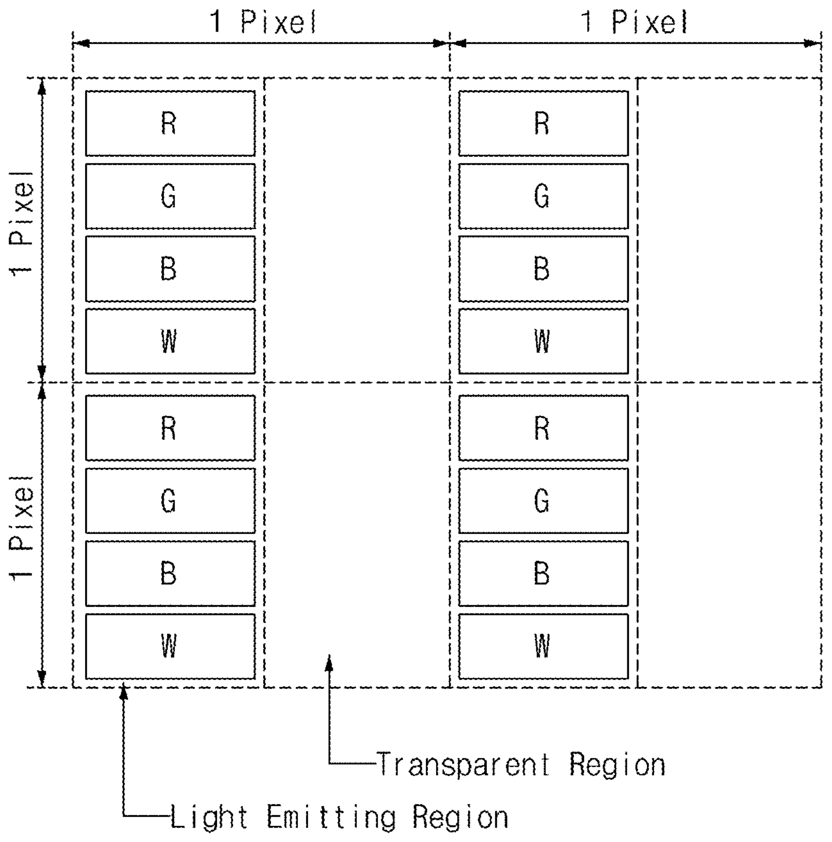
FIGS. 3A and 3B are diagrams illustrating various forms of a display according to an embodiment of the present disclosure.
Figure 3B:
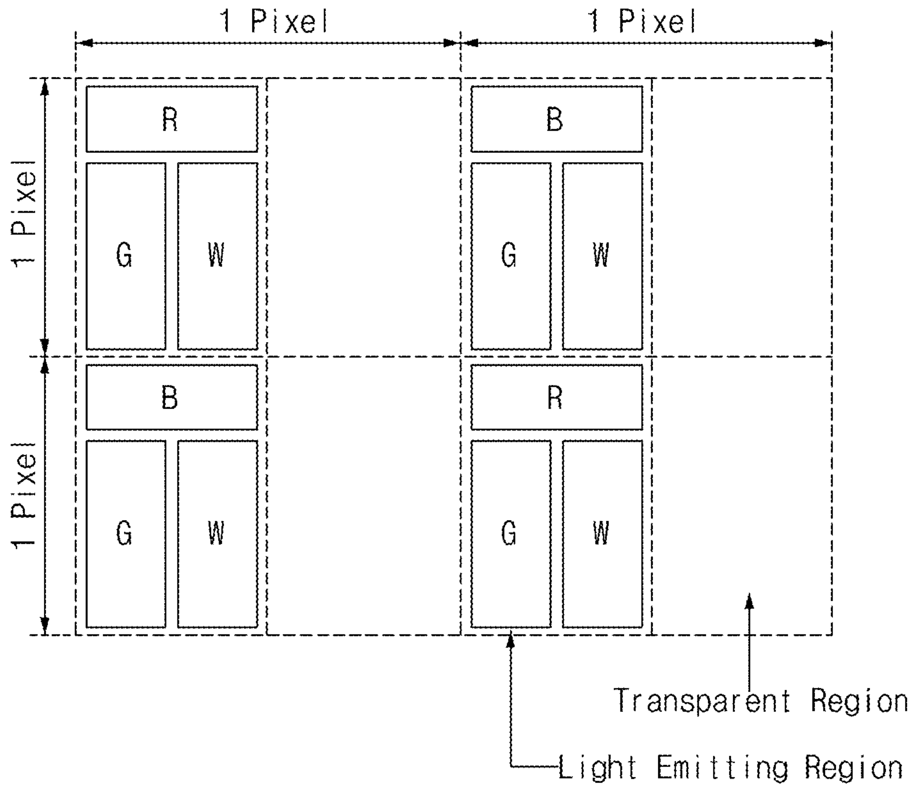

FIGS. 3A and 3B are diagrams illustrating various forms of a display according to an embodiment of the present disclosure.

Referring to FIG. 3A, a pixel may include a light-emitting area and a transparent area. In the light-emitting area, subpixels of RGBW (Red, Green, Blue, White) may be arranged vertically, and the transparent area without subpixels may be placed next to the light-emitting area.

Accordingly, the display 180 having a plurality of pixels may not only display an image but also transmit the light. The display 180 may be referred to as a transparent display panel or a transparent OLED (Organic Light Emitting Diode) panel.

Referring to FIG. 3B, a pixel may include a light emitting area and a transparent area. In the light emitting area, subpixels of RGW (Red, Green, White) or BGW (Blue, Green, White) may be arranged adjacent to each other, and the transparent area without subpixels may be placed next to the light-emitting area.

Accordingly, the display 180 having a plurality of pixels may not only display the image but also transmit the light. The display 180 may be referred to as a transparent display, a transparent display panel, or a transparent OLED panel.

Meanwhile, each subpixel may include an organic light emitting layer, a cathode, and an anode. When a current flows through the organic light emitting layer, the light may be emitted. The display 180 may emit the light with a specific wavelength using an organic light emitting layer.

Figure 4:
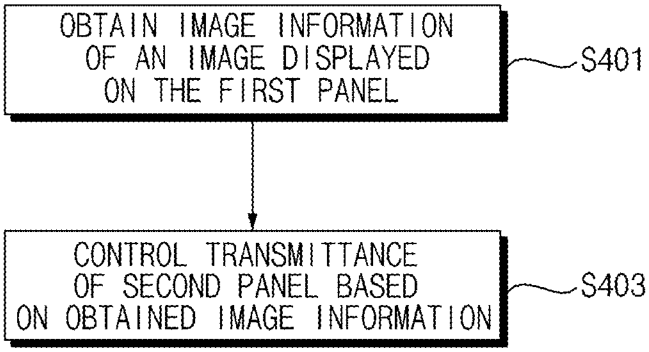
FIG. 4 is a flowchart illustrating a method of operating a display device according to an embodiment of the present disclosure.

FIG. 4 is a flowchart illustrating a method of operating a display device according to an embodiment of the present disclosure.

The display device 100 may include a first panel that displays an image, a second panel that blocks at least part of the first panel, and a controller 170 that controls the first panel and the second panel.

The display 180 may be referred to as a first panel 180, and the light-blocking panel 210 may be referred to as a second panel 210.

Referring to FIG. 4, the controller 170 of the display device 100 may obtain image information of an image displayed on the first panel 180 (S401).

In one embodiment, the image information may include image data applied to each of a plurality of pixels included in the first panel 180. Image data may include pixel values applied to each pixel.

When a pixel includes a red subpixel, a green subpixel, and a blue subpixel, the pixel value may include a value applied to the red subpixel, a value applied to the green subpixel, and a value applied to the blue subpixel.

If a pixel includes a red subpixel, a green subpixel, a blue subpixel, and a white subpixel, the pixel value may include a value applied to the red subpixel, a value applied to the green subpixel, a value applied to the blue subpixel, and a white subpixel.

In another embodiment, image information may include a gray level applied to each of a plurality of pixels included in the first panel 180. The controller 170 may obtain the gray level of a pixel based on the pixel value applied to each of the plurality of pixels.

In another embodiment, the image information may include the luminance of at least a partial area of the first panel 180.

In another embodiment, image information may include a main object and a background object included in the image.

The controller 170 may control the transmittance of the second panel 210 based on the obtained image information (S403).

In one embodiment, the controller 170 may locally control the transmittance of the second panel 210 based on obtained image information. For example, the controller 170 may control the transmittance of the first area of the second panel 210 to the first transmittance based on the obtained image information, and control the transmittance of the second area to a second transmittance different from the first transmittance.

The controller 170 may identify a specific area of the first panel 180 where the same image is displayed for more that a certain period of time at a fixed location, such as a logo, a channel number, a motionless object, or a background to control the transmittance of a partial area of the second panel 210 corresponding to the specific area. An image displayed for more than the certain period of time in a specific area among the entire area of the first panel 180 may be referred to as a fixed image or a specific image. A specific area may be referred to as a fixed area.

The fixed area may be an area where a logo, a channel number, a menu, or information is displayed.

As an example, the controller 170 may reduce the transmittance of a partial area of the second panel 210 that corresponds to the fixed image displayed on the first panel 180.

The controller 170 may reduce the transmittance of the partial area of the second panel 210 in proportion to the time at which the fixed image is displayed on the first panel 180. For example, as the displayed time of the fixed image becomes longer, the controller 170 may reduce the transmittance of the partial area of the second panel 210 corresponding to the fixed image.

The controller 170 may reduce the transmittance of the partial area of the second panel 210 and reduce the luminance of a specific area of the first panel 180 where the fixed image is displayed.

Afterimage is likely to occur due to the fixed image displayed on the first panel 210. In an embodiment of the present disclosure, the transmittance of the partial area of the second panel 210 corresponding to the fixed image may be reduced to darken a rear background of the partial area. In this way, the same image quality may be maintained even if the luminance of the fixed area where the fixed image is displayed is lowered.

Accordingly, even if the luminance of the fixed area is reduced, afterimage in the fixed area may be prevented while maintaining the same image quality. Additionally, since the current applied to the fixed area is reduced, the power consumption may be reduced.

In another embodiment, the controller 170 may extract a partial area of the entire area of the first panel 180 where the gray level is below a certain level, and reduce the transmittance of the partial area of the second panel 210 corresponding to the extracted partial area. For example, some areas where the gray level is below the certain level may be either a black area or a pure color area.

In another embodiment, the controller 170 may extract a partial area whose luminance is greater than a preset value from the entire area of the first panel 180, and reduce the transmittance of an area of the second panel 210 corresponding to the extracted partial area. The controller 170 may reduce the luminance of some areas where the luminance is above the preset value.

Figure 5:
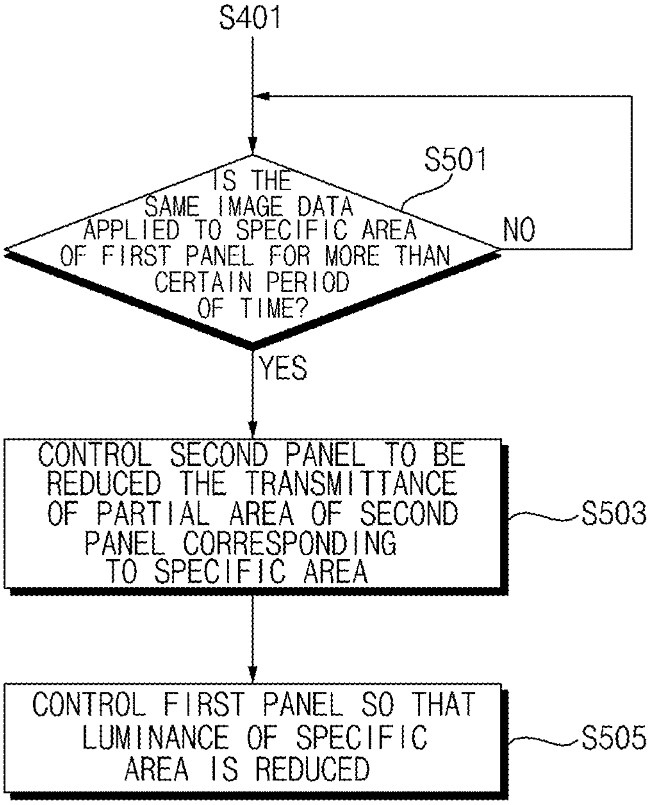
FIGS. 5 to 6B are diagrams illustrating a process for preventing afterimage caused by a fixed image displayed on a first panel according to an embodiment of the present disclosure.
Figure 6A:
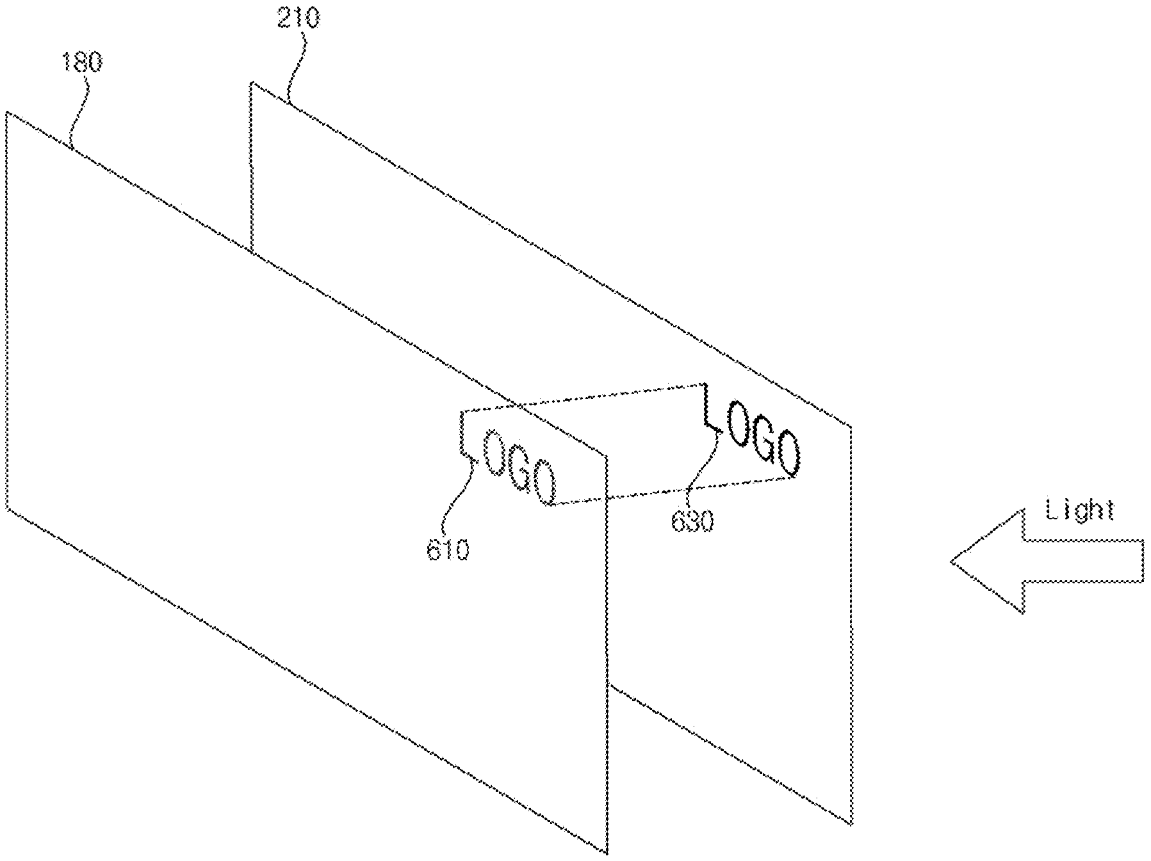
Figure 6B:
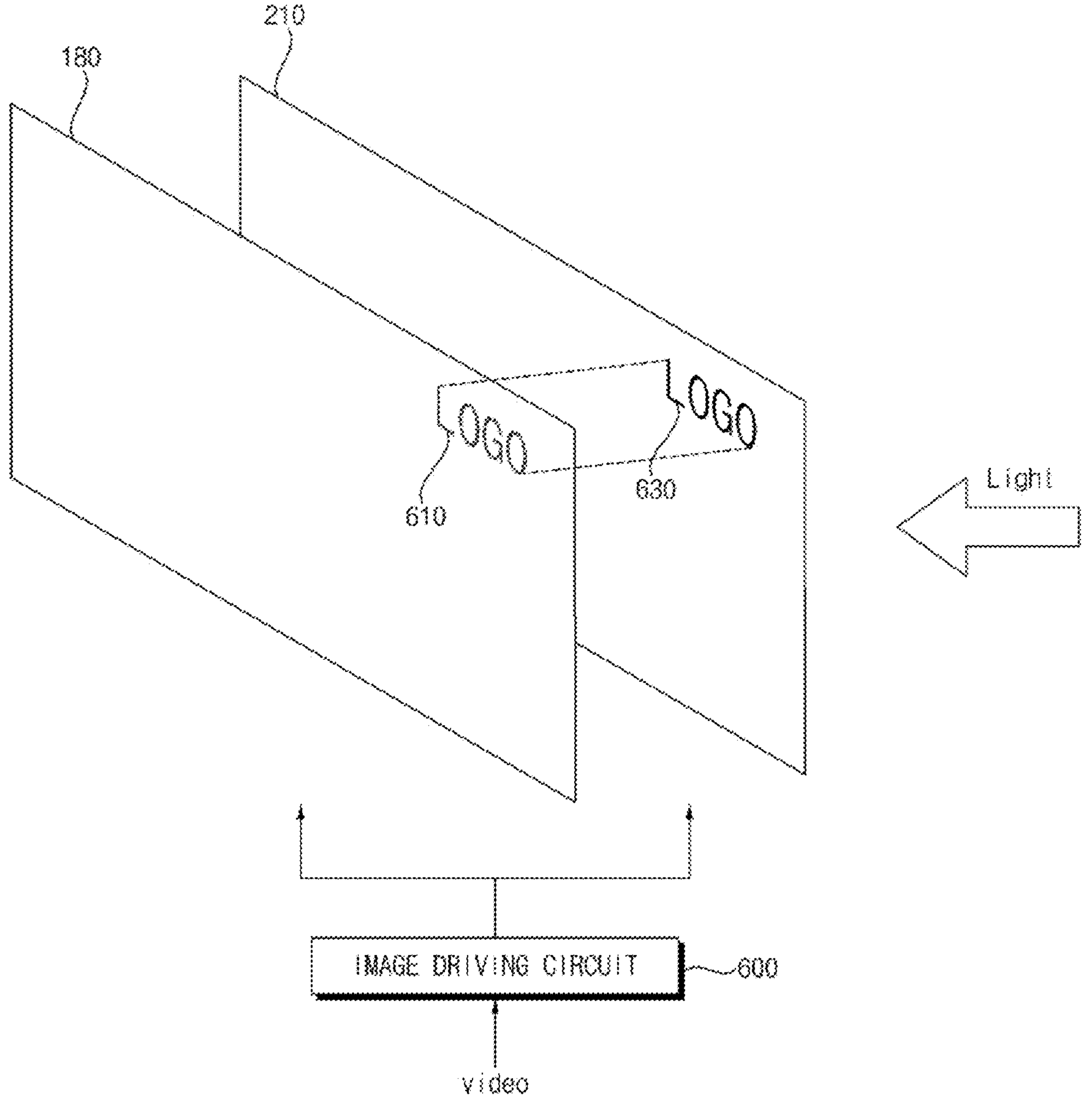

FIGS. 5 to 6B are diagrams illustrating a process for preventing afterimage caused by a fixed image displayed on a first panel according to an embodiment of the present disclosure.

The flowchart of FIG. 5 may be a diagram specifying step S403 of FIG. 4.

Referring to FIG. 5, the controller 170 of the display device 100 may determine whether the same image data is applied to a specific area of the entire area of the first panel 180 for more than a certain period of time based on image information of the image displayed on the first panel 180 (S501).

The controller 170 may determine whether the same pixel value or the same gray level is applied to the specific area of the first panel 180 for more than a certain period of time.

The certain amount of time may be 10 minutes, but this is only an example.

When the controller 170 determines that the same image data is applied to the specific area of the entire area of the first panel 180 for more than the certain period of time, control the second panel 210 to be reduced the transmittance of the partial area of the second panel 210 corresponding to the specific area (S503).

If it is determined that the same image data is applied to the specific area of the first panel 180 for more than the certain period of time, the controller 170 may identify the specific area as an area where the fixed image is displayed. The controller 170 may obtain a coordinate indicating a location of a specific area.

The controller 170 may apply a transmittance control signal to the second panel 210 to reduce the transmittance of the partial area of the second panel 210 corresponding to the specific area of the first panel 180. The transmittance control signal may include coordinate information indicating the location of the specific area and transmittance information requesting a decrease in transmittance. The transmittance information may include the transmittance to be reduced.

The second panel 210 may reduce the transmittance of the partial area of the second panel 210 corresponding to the specific area based on the transmittance control signal received from the controller 170.

The controller 170 may control the first panel 180 so that the luminance of the specific area of the first panel 180 is reduced (S505).

As the transmittance of the partial area of the second panel 210 decreases, the rear background of the partial area may darken. When the rear background of the partial area becomes dark, the fixed image displayed in the specific area of the first panel 180 corresponding to the partial area may become clearer. In other words, if the transmittance of the partial area is reduced and the background light is blocked, the brightness of the image perceived by the viewer may increase.

In this case, even if the luminance of the specific area of the first panel 180 is lowered, the image quality of the fixed image displayed on the specific area may remain the same.

The controller 170 may transmit a luminance control signal to the first panel 180 to lower the luminance of the specific area of the first panel 180 by a certain value. The first panel 180 may control a current flowing in the organic light emitting layer of the pixels included in the specific area to reduce the luminance of the specific area according to the brightness control signal.

That is, the controller 170 may reduce the current flowing through the organic light emitting layer of the pixels included in the specific area of the first panel 180 so that the luminance of the specific area is reduced. Accordingly, the effect of preventing afterimage occurring in the specific area of the first panel 180 may be obtained, and the effect of reducing the power consumption may be obtained.

Referring to FIG. 6A, a fixed image 610 may be displayed on a specific area of the display 180. The fixed image 610 may be a logo image representing a logo.

When the fixed image 610 is displayed on the first panel 180 for more than a certain period of time, the controller 170 may reduce the transmittance of a partial area 630 of the second panel 210 corresponding to the fixed image 610.

The partial area 630 may be an area corresponding to the fixed image 610 (the LOGO text image itself) or a rectangular area including the fixed image 610.

The image driving circuit 600 may control the first panel 180 to reduce the luminance of the fixed image 610 when the fixed image 610 is displayed on the first panel 610 for more than the certain period of time and control the second panel 210 to reduce the transmittance of the partial area 630.

The image driving circuit 600 may be included in the controller 170 or may be provided separately from the controller 170.

The image driving circuit 600 may reduce the current flowing in the organic light emitting layer of each pixel included in the fixed area of the first panel 180 to reduce the luminance of the fixed image 610.

When the second panel 210 is an LCD panel, the image driving circuit 600 may control the voltage applied to each pixel provided in the partial area of the second panel 210 to reduce the transmittance of the partial area 630.

Meanwhile, according to an embodiment of the present disclosure, the fixed area may be a banner area where a banner is displayed. The banner area may include text representing information, and the text may change at a regular interval.

The controller 170 may reduce the transmittance of the area of the second panel 210 corresponding to the remaining area excluding the text that changes every short time included in the banner area displayed on the first panel 180. The controller 170 may reduce the luminance of the remaining area of the banner area of the first panel 180.

Figure 7:
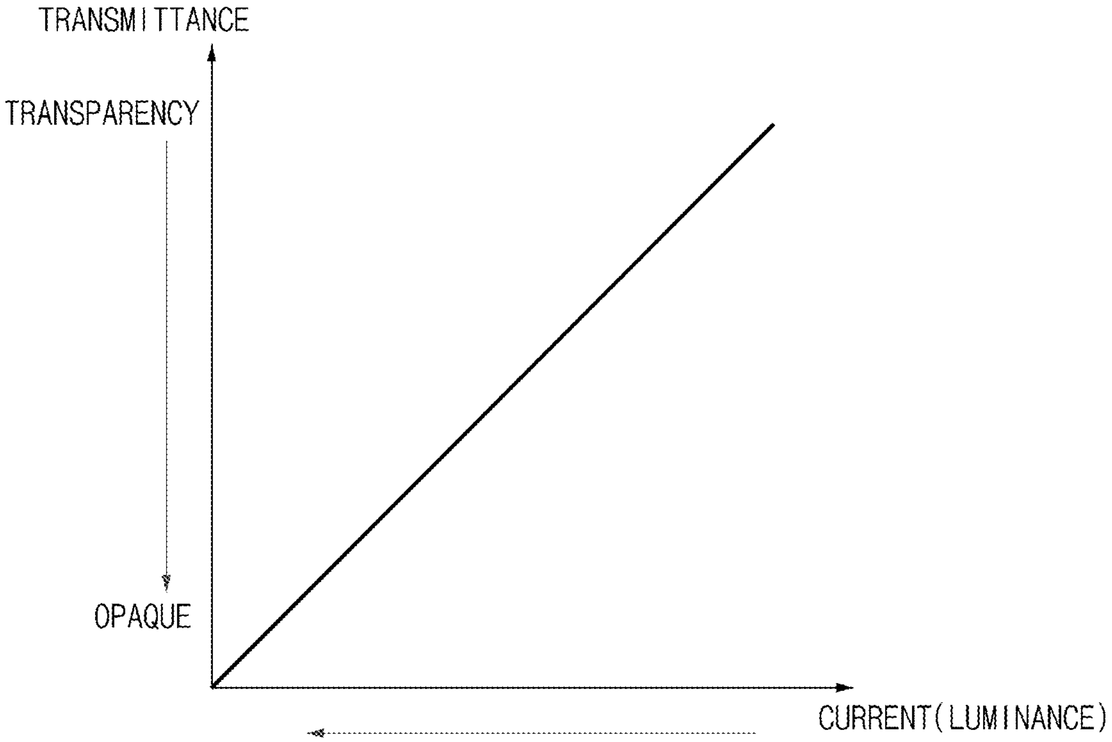
FIG. 7 is a diagram illustrating a relationship between a transmittance and a luminance according to an embodiment of the present disclosure.

FIG. 7 is a diagram illustrating a relationship between a transmittance and a luminance according to an embodiment of the present disclosure.

The luminance of the fixed area where the fixed image 610 of the first panel 180 is displayed and the transmittance of the partial area 630 of the second panel 210 corresponding to the fixed area may be proportional to each other.

The luminance of the fixed area may be replaced by the current applied to the pixels included in the fixed area.

The controller 170 may reduce the luminance of the fixed area of the first panel 180 as the transmittance of the partial area 630 of the second panel 210 decreases.

In one embodiment, the memory 140 of the display device 100 may store a lookup table representing a correspondence relationship between the luminance of the fixed area where the fixed image 610 is displayed and the transmittance of the partial area 630 of the second panel 210 corresponding to the fixed area.

When the controller 170 obtains the transmittance of the partial area 630 of the second panel 210, the controller 170 may extract the luminance matching the transmittance using the lookup table.

The graph of FIG. 7 may represent luminance-transmittance compensation logic that reduces the luminance as the transmittance decreases.

Figure 8:
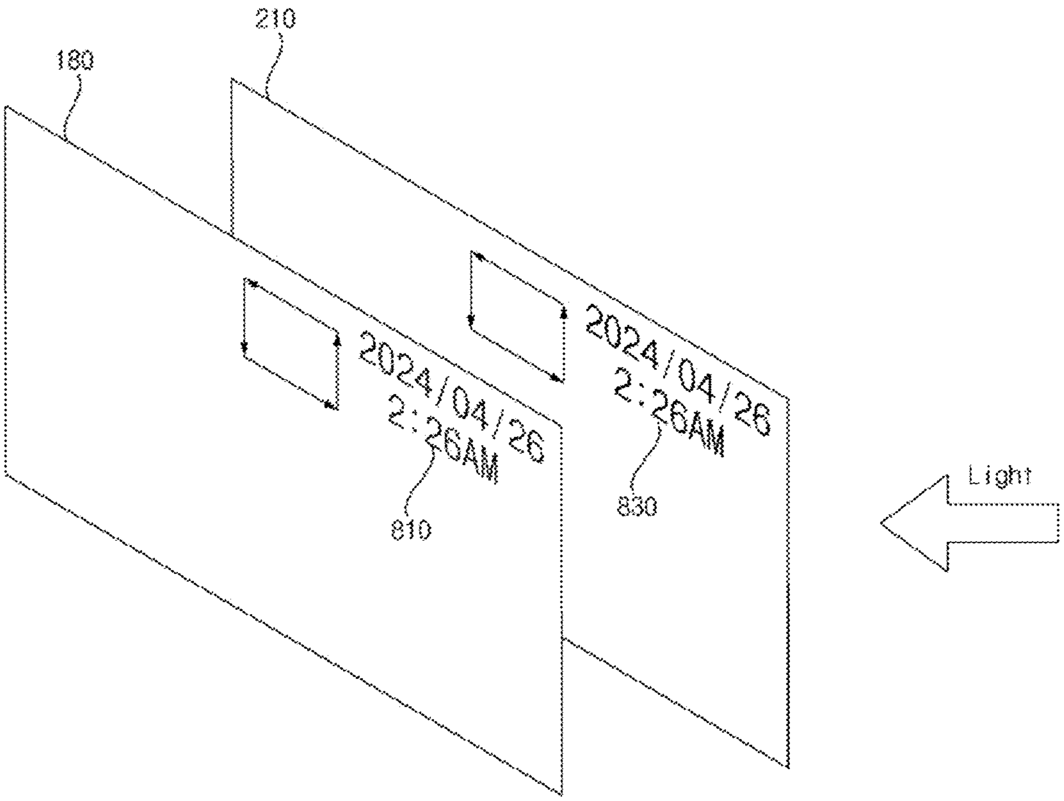
FIG. 8 is a diagram illustrating a method of preventing afterimages when displaying a menu or information displayed at a fixed position on the first panel according to an embodiment of the present disclosure.

FIG. 8 is a diagram illustrating a method of preventing afterimages when displaying a menu or information displayed at a fixed position on the first panel according to an embodiment of the present disclosure.

In particular, in FIG. 8, it is assumed that the first panel 180 uses a pixel shift technique to prevent afterimage.

The display device 100 may perform a pixel shift operation when a time information image 810 is displayed on the first panel 180 for more than the certain period of time. The pixel shift operation may be an operation that slightly moves the time information image 810 to prevent continuous load from being placed on specific pixels. The time information image 810 may be alternately moved in the up, down, left, and right directions.

The display device 100 may reduce the transmittance of the area 830 of the second panel 210 corresponding to the time information image 810. The display device 100 may move the area 830 of the second panel 210 as the time information image 810 moves, thereby reducing the transmittance of the moved area 830.

The display device 100 may reduce the luminance of the area of the first panel 180 where the time information image 810 is displayed. When the time information image 810 moves, the display device 100 may reduce the luminance of the area of the first panel 180 that is moved in accordance with the movement of the time information image 810.

Accordingly, the image quality of the time information image 810 remains the same, and the afterimage prevention effect may be maximized.

Figure 9:
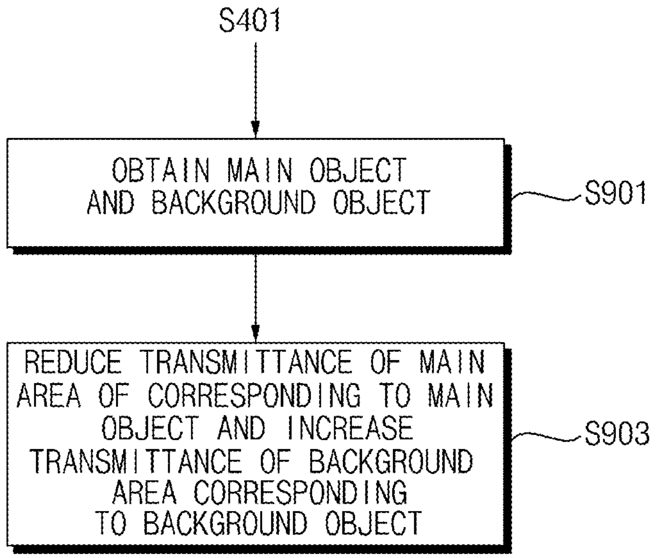
FIG. 9 is a flowchart illustrating a method of operating a display device according to another embodiment of the present disclosure.

FIG. 9 is a flowchart illustrating a method of operating a display device according to another embodiment of the present disclosure.

FIG. 9 may be an embodiment embodying step S403 of FIG. 4. FIG. 9 may be an example of recognizing of a main object and a background object displayed on the first panel 180 to control the transmittance of a main area of the second panel 210 corresponding to the main object and a background area of the second panel 210 corresponding to the background object.

Referring to FIG. 9, the controller 170 may obtain the main object and the background object based on image information of the image displayed on the first panel 180 (S901).

In one embodiment, image information may include feature points of the image. Each of the feature points may be a point representing an edge of the object. The controller 170 may extract a plurality of feature points from the image and obtain an outline connecting the plurality of extracted feature points.

The controller 170 may recognize the area formed by the outline as the main object. The controller 170 may identify an area other than the main object as the background object.

In another embodiment, the controller 170 may extract the main object and the background object from an image frame that constitutes an image using an artificial intelligence model. The Artificial intelligence model is a deep learning or a machine learning-based model that may extract the main object from the image frame. The artificial intelligence model may be a model using a convolutional neural network (CNN) algorithm or a YOLO (You Only Look Once) algorithm.

The main object may be any one of a person, an animal, or a thing.

The main object may be referred to as a main image or a main area, and the background object may be referred to as a background image or a background area.

In another embodiment, the main object may represent an area where luminance is more than or equal to a preset value.

The controller 170 may reduce the transmittance of the main area of the second panel 210 corresponding to the main object and increase the transmittance of the background area of the second panel 210 corresponding to the background object (S903).

The controller 170 may control the second panel 210 to reduce the transmittance of the main area of the second panel 210 corresponding to a location of the main object and increase the transmittance of the background area of the second panel 210 corresponding to the background object.

Accordingly, the contrast ratio difference between the main object and the background object may be maximized.

Figure 10:
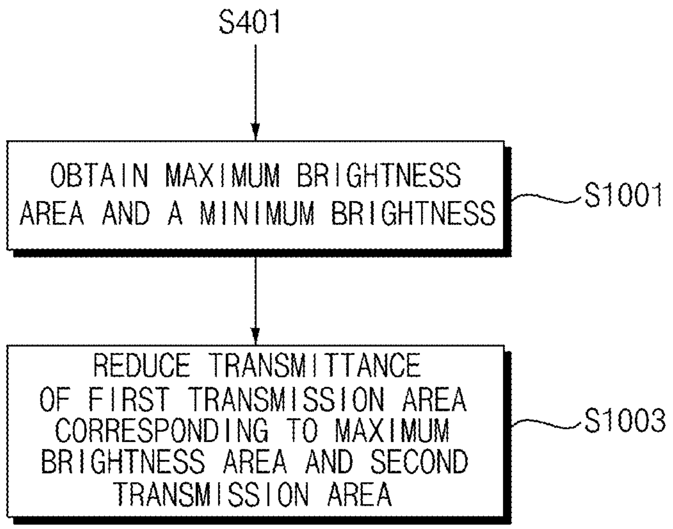
FIG. 10 is a flowchart illustrating a method of operating a display device according to another embodiment of the present disclosure.

FIG. 10 is a flowchart illustrating a method of operating a display device according to another embodiment of the present disclosure.

The controller 170 may obtain a maximum brightness area and a minimum brightness area based on image information of the image displayed on the first panel 180 (S1001).

The controller 170 may extract pixels whose brightness is more than or equal to a preset first value using the pixel value of each of the plurality of pixels included in the image information. The controller 170 may obtain an area formed by the extracted pixels as the maximum brightness area. The maximum brightness area may be a pure color area.

The controller 170 may extract pixels whose brightness is less than a preset second value using the pixel value of each of the plurality of pixels included in the image information. The controller 170 may obtain an area formed by the extracted pixels as the minimum brightness area. The minimum brightness area may be a black area.

The controller 170 may reduce the transmittance of a first transmission area of the second panel 210 corresponding to the maximum brightness area and a second transmission area of the second panel 210 corresponding to the minimum brightness area (S1003).

The controller 170 may reduce the transmittance of the first transmission area of the second panel 210 corresponding to the maximum brightness area and the second transmission area of the second panel 210 corresponding to the minimum brightness area to a preset transmittance.

In particular, When a HDR (High Dynamic Range) image is input, the contrast ratio with the remaining area may be maximized by reducing the transmittance of the maximum brightness area and the minimum brightness area. Accordingly, the effect of HDR image that maximize the difference between bright and dark areas may be improved.

Figure 11:
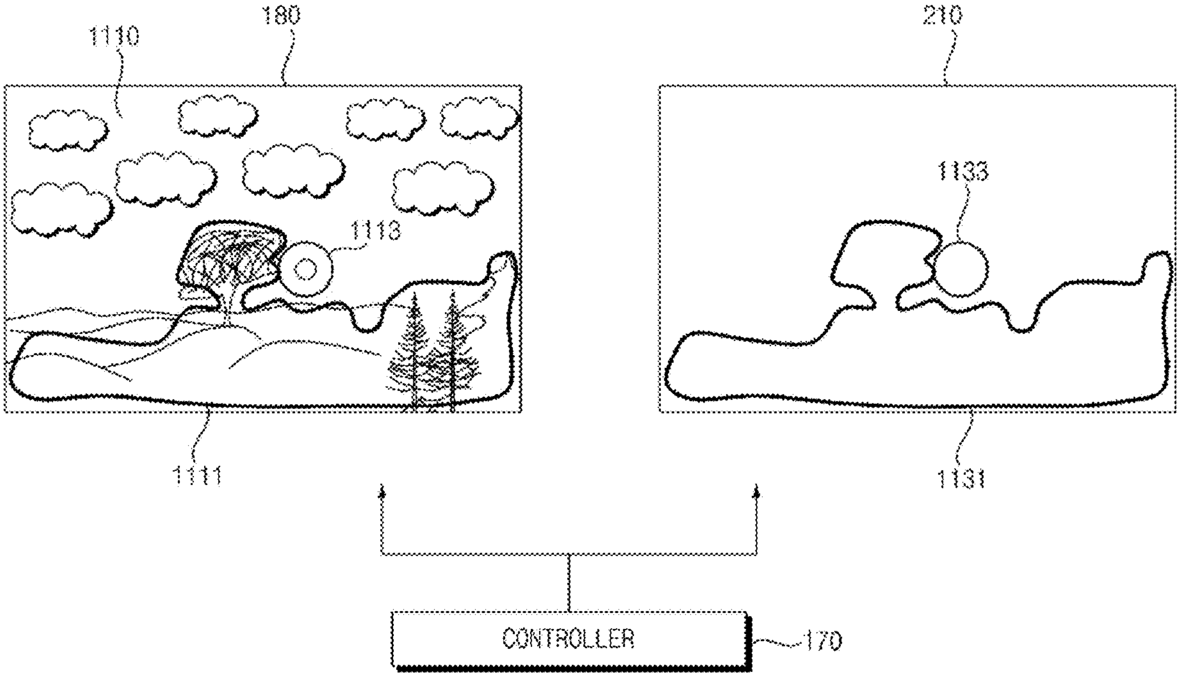
FIG. 11 is a diagram illustrating an example of reducing the transmittance of the maximum brightness area and the minimum brightness area of an image according to an embodiment of the present disclosure.

FIG. 11 is a diagram illustrating an example of reducing the transmittance of the maximum brightness area and the minimum brightness area of an image according to an embodiment of the present disclosure.

Referring to FIG. 11, an image 1110 may be displayed on the first panel 180. The image 1110 may be an HDR image. The controller 170 of the display device 100 may extract a minimum brightness area 1111 and a maximum brightness area 1113 from the image 1110.

The controller 170 may obtain coordinate information about areas occupied by each of the minimum brightness area 1111 and the maximum brightness area 1113.

The controller 170 may identify the first transmission area 1131 of the second panel 210 corresponding to the minimum brightness area 1111 and the second transmission area 1133 of the second panel 210 corresponding to the maximum brightness area 1113.

The controller 170 may reduce the transmittance of each of the first transmission area 1131 and the second transmission area 1133. The controller 170 may control the second panel 210 so that the transmittance of each of the first transparent area 1131 and the second transparent area 1133 is 10.

Accordingly, the contrast ratio between the minimum brightness area 1111 and maximum brightness area 1113 and the remaining area may be maximized. When the contrast ratio is maximized, the image quality may be improved and a color reproduction rate may be improved.

Figure 12:
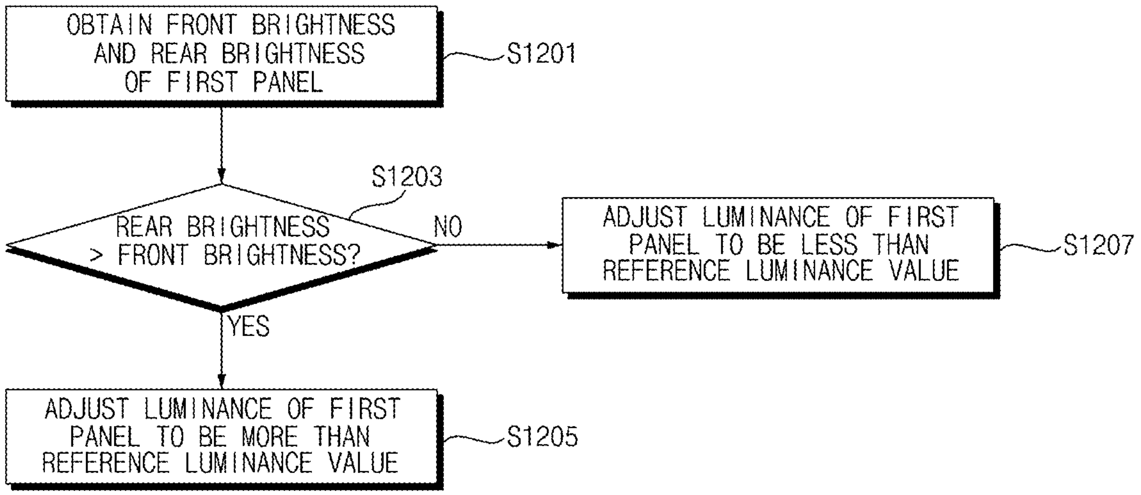
FIGS. 12 to 13 are flowcharts illustrating a process of controlling one or more of the first panel and a second panel based on a front brightness and a rear brightness of the display device according to an embodiment of the present disclosure.
Figure 13:
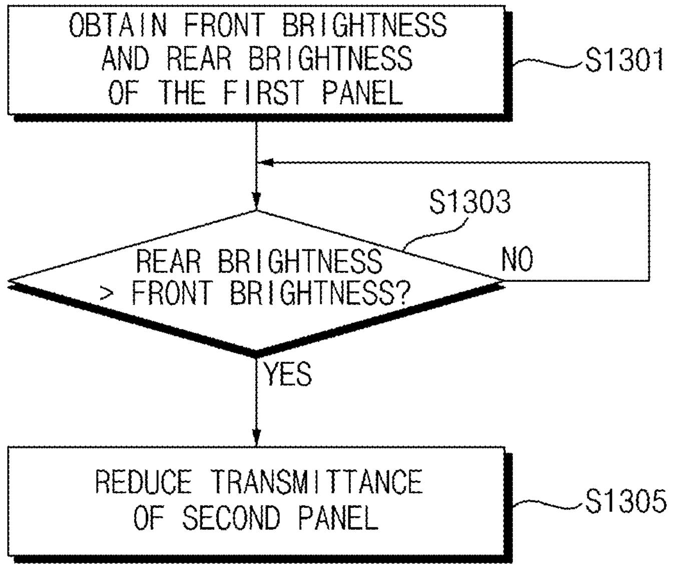

FIGS. 12 to 13 are flowcharts illustrating a process of controlling one or more of the first panel and a second panel based on a front brightness and a rear brightness of the display device according to an embodiment of the present disclosure.

Referring to FIG. 12, the controller 170 of the display device 100 may obtain a front brightness and a rear brightness of the first panel 180 (S1201).

A front side of the first panel 180 may be the side on which the viewer watches the image, and a rear side of the first panel 180 may be the opposite side of the front side.

An illuminance sensor may be provided on the front side of the first panel 180 and the rear side of the first panel 180, respectively. The controller 170 may obtain the front brightness and the rear brightness of the first panel 180 using two illuminance sensors.

The controller 170 may determine whether the rear brightness is greater than the front brightness (S1203), and if the rear brightness is greater than the front brightness, the controller 170 may adjust the luminance of the first panel 180 to be more than a reference luminance value (S1205).

When the rear brightness is greater than the front brightness, the controller 170 may change the luminance of the first panel 180 to be more than the reference luminance value to improve visibility.

If the obtained rear brightness is less than the front brightness, the controller 170 may adjust the luminance of the first panel 180 to be less than the reference luminance value (S1207).

When the rear brightness is less than the front brightness, the controller 170 may change the luminance of the first panel 180 to be less than the reference luminance. This is because when the background becomes dark, the effect on visibility becomes smaller even if the luminance is low.

Next, FIG. 13 will be described.

The controller 170 of the display device 100 may obtain the front brightness and rear brightness of the first panel 180 (S1301).

The controller 170 may determine whether the rear brightness is greater than the front brightness (S1303), and if the rear brightness is greater than the front brightness, the controller 170 may reduce the transmittance of the second panel 210 (S1305).

When the rear brightness is greater than the front brightness, the controller 170 may change the transmittance of the second panel 180 to be less than the reference transmittance to improve the visibility.

If the obtained rear brightness is smaller than the front brightness, the controller 170 may increase the transmittance of the second panel 210.

If the rear brightness is less than the front brightness, the controller 170 may change the transmittance of the second panel 210 to be more than the reference transmittance. This is because when the background becomes dark, the effect on the visibility decreases even if the transmittance increases.

Figure 14:
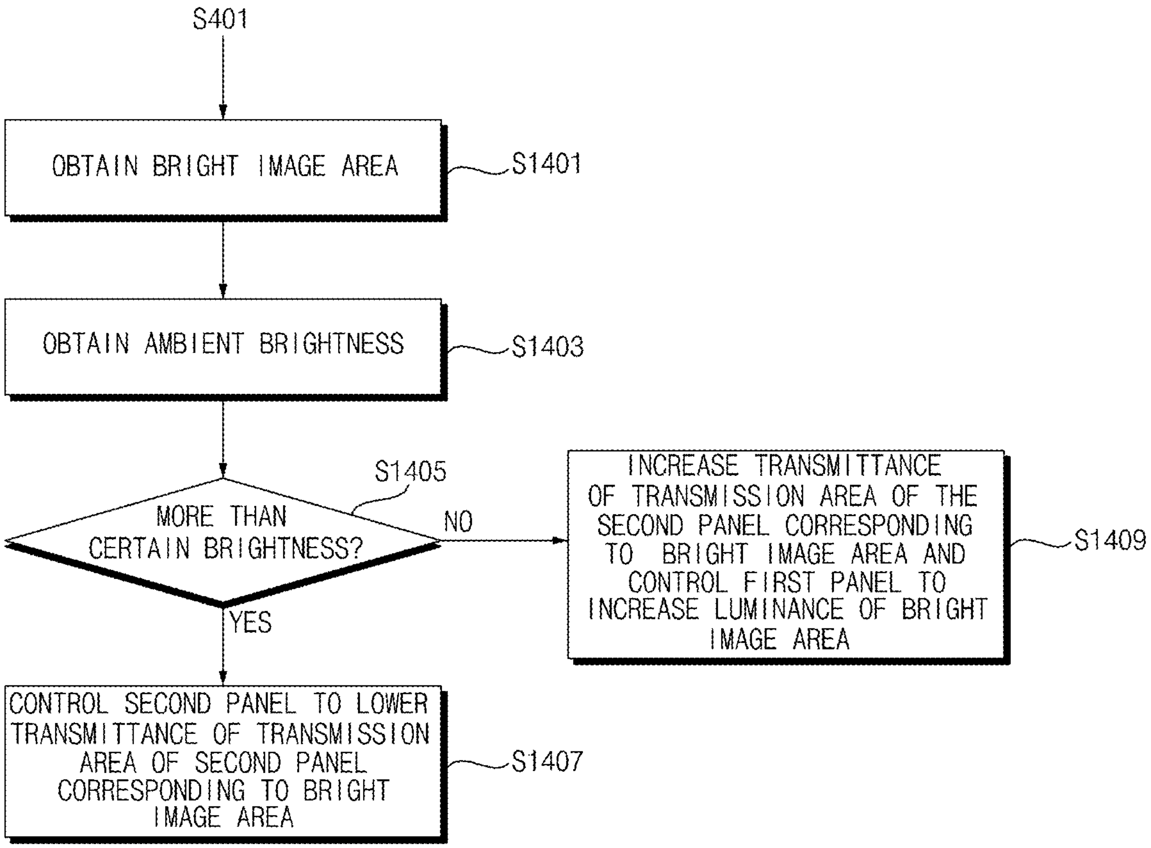
FIG. 14 is a diagram illustrating an example of adjusting the transmittance or the luminance of a bright image area of a HDR image according to ambient brightness when an HDR image is input according to an embodiment of the present disclosure.

FIG. 14 is a diagram illustrating an example of adjusting the transmittance or the luminance of a bright image area of a HDR image according to ambient brightness when an HDR image is input according to an embodiment of the present disclosure.

The controller 170 may obtain a bright image area based on image information of an image displayed on the first panel 180 (S1401).

The image information may include metadata indicating that the image input to the first panel 180 is an HDR image.

The controller 170 may extract a bright image area from an entire area of the HDR image. The controller 170 may extract pixels whose brightness is more than or equal to a preset first value using the pixel value of each of the plurality of pixels included in the image information. The controller 170 may obtain an area formed by the extracted pixels as a bright image area.

The controller 170 may obtain an ambient brightness of the display device (S1403).

An illumination sensor may be provided on the first panel 180 or the second panel 210. The controller 170 may measure the ambient brightness through the sensing value measured by the illuminance sensor.

The controller 170 may determine whether the obtained ambient brightness is more than a certain brightness (S1405).

If it is determined that the obtained ambient brightness is more that the certain brightness, the controller 170 may control the second panel 210 to lower the transmittance of the transmission area of the second panel 210 corresponding to the bright image area (S1407).

When it is determined that the obtained ambient brightness is more that the certain brightness, the controller 170 may lower the transmission area of the second panel 210 corresponding to the bright image area to improve the visibility of the bright image area (to display it brighter). The controller 170 may lower the transmittance of the transmission area of the second panel 210 corresponding to the bright image area to the maximum.

If it is determined that the obtained ambient brightness is less than the certain brightness, the controller 170 may increase the transmittance of the transmission area of the second panel 210 corresponding to the bright image area and control the first panel 180 to increase the luminance of the bright image area (S1409).

When it is determined that the obtained ambient brightness is less than the certain brightness, the controller 170 control the first panel 180 to increase the luminance of the bright image area instead of increasing the transmittance of the transmission area of the second panel 210 corresponding to the bright image area.

As such, according to an embodiment of the present disclosure, when an HDR image is input, the contrast ratio of the image may be greatly improved by adjusting the transmittance or the luminance of the bright image area of the HDR image according to the ambient brightness.

In the embodiment of FIG. 14, it may also be applied to dark image area of the HDR image. In another embodiment, the controller 170 may extract a dark image area from the entire area of the HDR image. The controller 170 may extract pixels whose brightness is less than a preset second value using the pixel value of each of the plurality of pixels included in the image information. The controller 170 may obtain an area formed by the extracted pixels as the dark image area.

Figure 15:
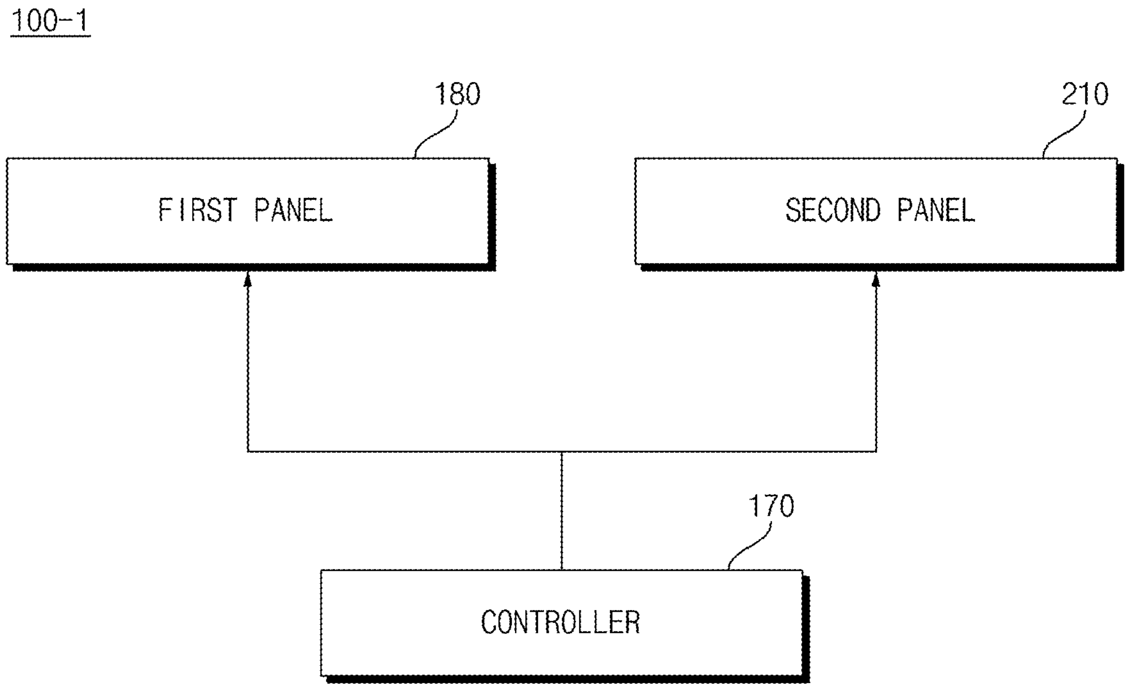
FIG. 15 is a diagram illustrating the configuration of a display device according to another embodiment of the present disclosure.

FIG. 15 is a diagram illustrating the configuration of a display device according to another embodiment of the present disclosure.

The display device 100-1 according to another embodiment of the present disclosure may include a first panel 180, a second panel 210, and a controller 170.

The first panel 180 may display an image. The first panel 180 may be a transparent OLED display panel.

The second panel 210 may be a light-blocking panel capable of blocking light. The second panel 210 may block at least a portion of the area corresponding to the first panel 180. The second panel 210 may locally block at least a portion of the area corresponding to the first panel 180.

The second panel 210 may be one of an LCD panel, a MEMS panel, or an electrowetting panel.

The controller 170 may obtain image information of the image displayed on the first panel 180.

The controller 170 may control the transmittance of the second panel 210 based on the obtained image information.

The display device 100-1 according to an embodiment of the present disclosure may an image receiver 130 configured to receive an image; a first panel 180 including a plurality of pixels and configured to display the image received by the image receiver through the plurality of pixels; a second panel 210 disposed on one side of the first panel 180 and controlled to selectively transmit light to an area of the first panel; and a controller 170 configured to: obtain image information of the image displayed on the first panel and control a transmittance of the second panel based on the obtained image information.

The image information may be a gray level applied to each of the plurality of pixels, the controller 170 may control the second panel 210 to reduce the transmittance of a partial area of the second panel corresponding to a partial area of the first panel 180 where the gray level is less that a certain level.

The image information may be a pixel value applied to each of the plurality of pixels, the controller 170 may identify a fixed area of the first panel 180 to which the same pixel value is applied for more than a certain period of time and control the second panel 210 to reduce the transmittance of a partial area of the second panel 210 corresponding to the fixed area.

The controller 170 may control the first panel 180 to reduce a luminance of the fixed area of the first panel 180.

The fixed area of the first panel 180 may be an area where a logo, a channel number, a menu or information is displayed.

The controller 170 may move the partial area of the second panel 210 to be matched a movement of the fixed area when the fixed area is moved to prevent afterimage.

The controller 170 may control the transmittance of the second panel 210 based on the obtained image information, locally.

The controller 170 may adjust the transmittance of a first area of the second panel 210 to a first transmittance, based on the image information, and adjust the transmittance of a second area of the second panel 210 to a second transmittance different from the first transmittance.

The controller 170 may obtain a main image and a background image from the image based on the image information, reduce the transmittance of the first area of the second panel 210 corresponding to the main image, and increase the transmittance of the second area of the second panel 210.

The second panel 210 may be one of a Liquid Crystal Display (LCD) panel, a Micro Electro Mechanical System (MEMS) panel, or an Electro wetting panel.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

What is claimed is:

1. A display device, comprising:
- an image receiver configured to receive an image;
- a first panel including a plurality of pixels and configured to display the image through the plurality of pixels;
- a second panel corresponding to the first panel and configured to selectively transmit light to an area of the first panel; and
- a controller configured to:
- obtain image information of the image displayed on the first panel; and
- control a transmittance of the second panel based on the obtained image information,
- wherein the controller is configured to:
- identify a fixed area of the first panel at which one or more pixel values is applied for longer than a certain time threshold,
- control the second panel to reduce the transmittance of a partial area of the second panel corresponding to the fixed area, and
- control the first panel to reduce a luminance at the fixed area of the first panel.

2. The display device of claim 1, wherein the image information comprises pixel values applied to each of the plurality of pixels.

3. The display device of claim 1, wherein the fixed area of the first panel is an area where a logo, a channel number, a menu, or static information is displayed.

4. The display device of claim 1, wherein the controller is further configured to move the partial area of the second panel to match a movement of the fixed area.

5. The display device of claim 1, wherein the controller is configured to control the transmittance of the second panel locally based on the obtained image information.

6. The display device of claim 5, wherein the controller is configured to:
- adjust the transmittance of a first area of the second panel to a first transmittance, based on the image information, and
- adjust the transmittance of a second area of the second panel to a second transmittance different from the first transmittance.

7. The display device of claim 6, wherein the controller is further configured to:
- obtain a main image and a background image of the displayed image based on the image information,
- reduce the transmittance of the first area of the second panel corresponding to the main image, and
- increase the transmittance of the second area of the second panel.

8. The display device of claim 1, wherein the second panel is one of a Liquid Crystal Display (LCD) panel, a Micro Electro Mechanical System (MEMS) panel, or an Electro wetting panel.

9. The display device of claim 1, wherein the controller is further configured to:
- based on the image being a high dynamic range (HDR) image, identify a bright image area of the HDR image based on the image information;
- obtain an ambient brightness of the display device;
- control the second panel to lower the transmittance of a transmission area of the second panel corresponding to the bright image area based on the obtained ambient brightness being greater than a certain brightness threshold; and,
- control the second panel to increase the transmittance of the transmission area of the second panel corresponding to the bright image area and control the second panel to increase a luminance of the bright image area based on the obtained ambient brightness being less than the certain brightness threshold.

10. An operating method of a display device, the method comprising:
- receiving an image to be displayed;
- displaying the image through a plurality of pixels of a first panel of the display device;
- obtaining image information of the image displayed on the first panel; and
- controlling a transmittance of a second panel of the display device, corresponding to the first panel, based on the obtained image information,
- wherein the method further comprises:
- identifying a fixed area of the first panel at which one or more pixel values is applied for longer than a certain time threshold;
- controlling the second panel to reduce the transmittance of a partial area of the second panel corresponding to the fixed area; and
- controlling the first panel to reduce a luminance at the fixed area of the first panel.

11. The method of claim 10, wherein the image information comprises pixel values applied to each of the plurality of pixels.

* * * * *